(12) United States Patent
Frait et al.

(10) Patent No.: US 8,770,364 B2
(45) Date of Patent: Jul. 8, 2014

(54) MODULAR POWERTRAIN COMPONENT FOR HYBRID ELECTRIC VEHICLES

(75) Inventors: Steven A. Frait, Milan, MI (US); Keith A. Devereaux, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 13/362,024

(22) Filed: Jan. 31, 2012

(65) Prior Publication Data

US 2013/0192946 A1 Aug. 1, 2013

(51) Int. Cl.
*B60K 6/387* (2007.10)
*B60K 6/40* (2007.10)

(52) U.S. Cl.
USPC ............... 192/3.33; 192/85.25; 180/65.25; 903/914

(58) Field of Classification Search
USPC .............. 192/3.21, 3.33, 85.25; 903/914, 952
See application file for complete search history.

(56) References Cited

U.S. PATENT DOCUMENTS

| 7,679,238 | B2 | 3/2010 | Nomura et al. | |
|---|---|---|---|---|
| 2007/0007095 | A1 | 1/2007 | Tsukamoto et al. | |
| 2008/0093135 | A1 | 4/2008 | Nomura et al. | |
| 2010/0038201 | A1* | 2/2010 | Mueller et al. | 192/3.29 |
| 2010/0105518 | A1 | 4/2010 | Kasuya et al. | |
| 2010/0105519 | A1 | 4/2010 | Kasuya et al. | |
| 2011/0239818 | A1 | 10/2011 | Kasuya et al. | |
| 2011/0240430 | A1 | 10/2011 | Iwase et al. | |
| 2011/0240431 | A1 | 10/2011 | Iwase et al. | |
| 2012/0080248 | A1* | 4/2012 | Kasuya et al. | 180/65.21 |
| 2012/0175212 | A1* | 7/2012 | Hart et al. | 192/48.601 |

* cited by examiner

*Primary Examiner* — Richard M. Lorence
(74) *Attorney, Agent, or Firm* — David B. Kelley; MacMillan, Sobanski & Todd, LLC

(57) ABSTRACT

A powertrain module includes an input, a first bulkhead supporting the input for rotation, a hub, an electric machine including a stator connected to the first bulkhead and a rotor connected to the hub, a clutch for alternately opening and closing a drive connection between the input and the rotor, a servo for actuating the clutch and supported on the input, and a second bulkhead supporting the hub for rotation.

18 Claims, 2 Drawing Sheets

MODULAR POWERTRAIN COMPONENT FOR HYBRID ELECTRIC VEHICLES

BACKGROUND OF THE INVENTION

1. Field of the Invention

This invention relates to a powertrain of hybrid electric vehicles, particularly to a powertrain module that can be installed between and secured to an engine output and a transmission input.

2. Description of the Prior Art

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

The module should require low manufacturing and assembly costs and no vehicle body modification, and should provide reliable performance.

SUMMARY OF THE INVENTION

A powertrain module includes an input, a first bulkhead supporting the input for rotation, a hub, an electric machine including a stator connected to the first bulkhead and a rotor connected to the hub, a clutch for alternately opening and closing a drive connection between the input and the rotor, a servo for actuating the clutch and supported on the input, and a second bulkhead supporting the hub for rotation.

A torque converter casing can be driven by the engine alone, provided the electric machine is off and clutch is engaged; by the electric machine alone, provided the engine is off or the engine in operating and the clutch is disengaged; and by both the engine and electric machine concurrently.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1A:
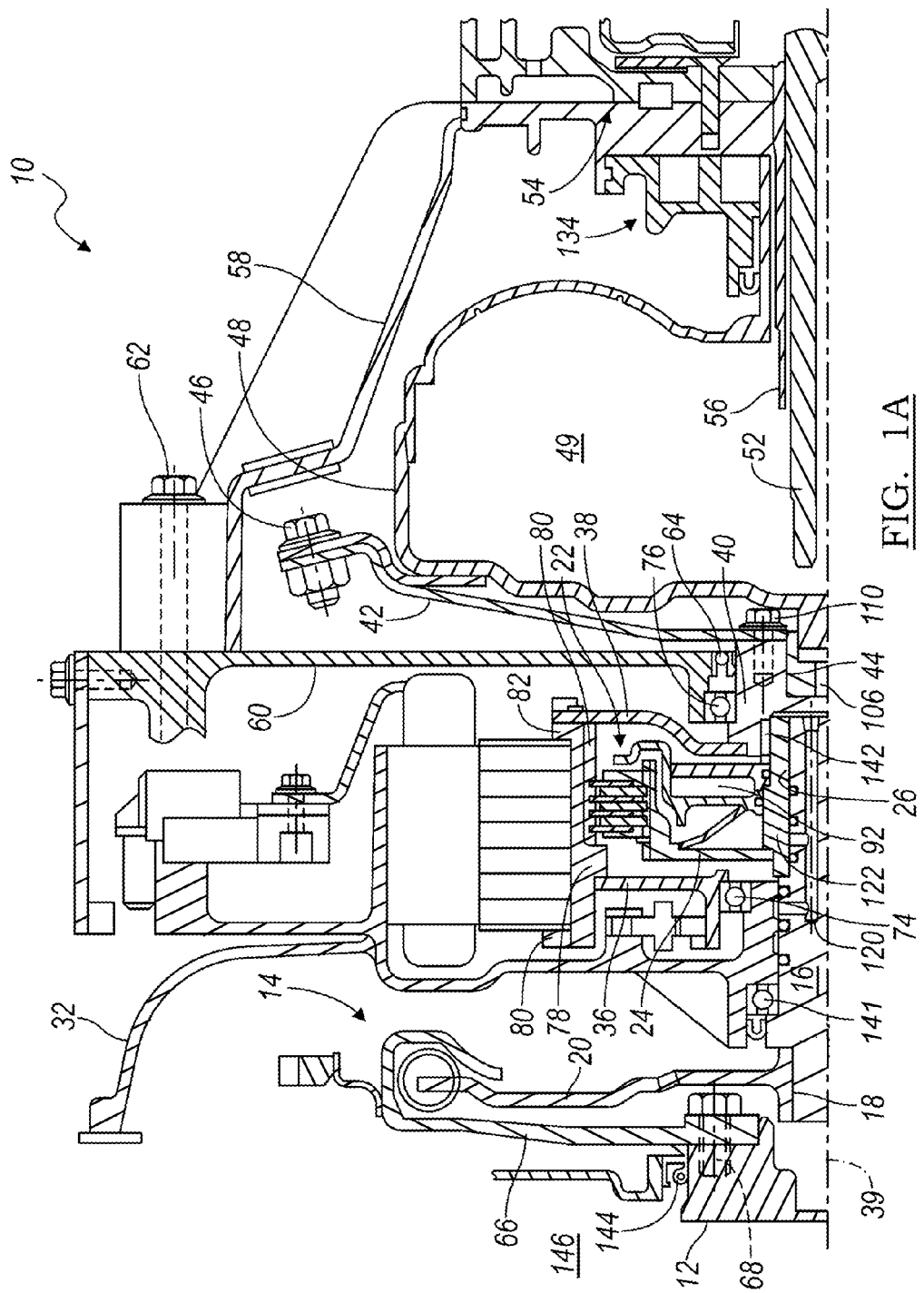
FIGS. 1A and 1B comprise a side cross-sectional view of a powertrain module showing a front connection to an engine output and a rear connection to a transmission torque converter input.
Figure 1B:
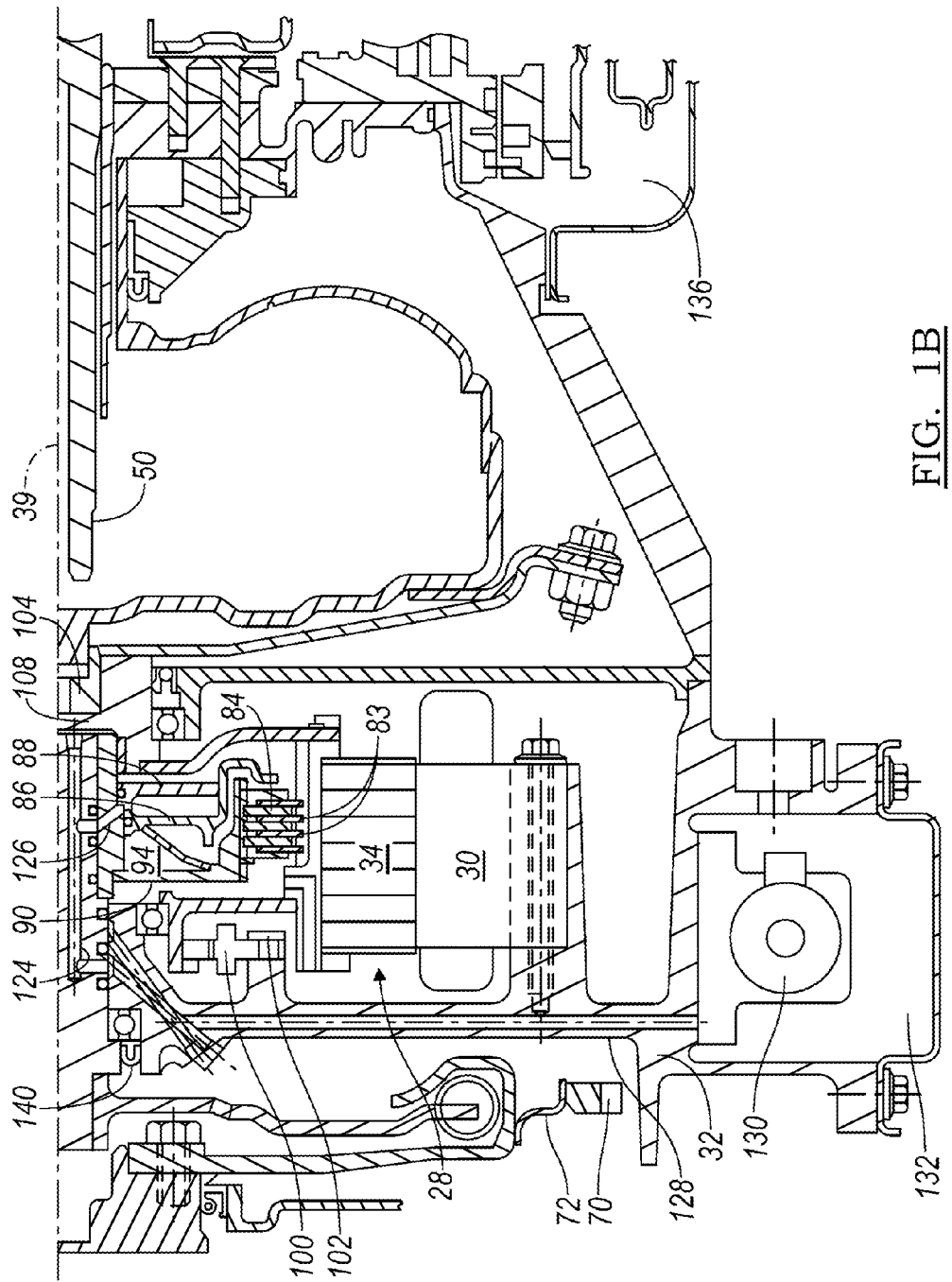

FIGS. 1A and 1B illustrate a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to second leg 38; and a flexplate 42, secured at one end by a spline connection 44 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel 66.

A bearing 74 supports the first leg 36 for rotation on the front bulkhead 32. A bearing 76 supports the second leg 38 for rotation on the rotor hub 40.

A tube 78, aligned with axis 39 and supporting the windings of rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 80, which is engaged by alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, reaction wall 88 (sometimes called a balance dam), return spring 90 and hydraulic lines for transmitting actuating pressure to the pressure control volume 92 at the right hand side of piston 86 and to the pressure balance volume 94 at the left hand side of the piston. Piston 86 moves leftward in a cylinder bounded by the second leg 38 and rotor hub 40 when actuating pressure and hydraulic fluid is supplied to pressure control volume 92, thereby causing clutch 22 to engage and driveably connect rotor 34 and the engine output 12 through damper 14, input shaft 16, clutch hub 24 and clutch 22.

Because the clutch hub 24 is secured by spline 26 to input shaft 16 and the piston 86, reaction wall 88 and return spring 90 are supported on the clutch hub, rotational inertia of the piston 86, balance dam 88, clutch hub 24 and return spring 90 is located on the input side, i.e., the engine side of clutch 22.

Rotor 34 is continually driveably connected to the transmission input shaft 52 through the torque path that includes second leg 38, rotor hub 40, flexplate 42, torque converter casing 48, the hydrodynamic drive connection between the torque converter impeller and turbine, which is connected to transmission input shaft 52.

A resolver 100, a highly accurate type of rotary electrical transformer used for measuring degrees of rotation, is secured by bolts 102 to the front bulkhead 32, is supported on the front bulkhead 32 and first leg 36, and is located axially between the front bulkhead 32 and rear bulkhead 60.

The teeth of spline 44, which produces a rotary drive connection between to the flexplate 42 and rotor hub 40, are fitted together such that no lash is produced when torque is transmitted between the flexplate and rotor hub. Flexplate 42 is formed with a thick walled portion 104 having a threaded hole 106 that terminates at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Input shaft 16 is formed with axially-directed hydraulic passages, which communicate with a-laterally-directed passages, which carry hydraulic fluid and pressure to module 10 from the hydraulic system of the transmission 54. Axial passage 120 and lateral passage 122 carry hydraulic fluid and pressure to the pressure balance volume 94 between hub 24 and piston 86. Axial passage 124 and radial passage 126 carry hydraulic fluid and pressure to the clutch pressure control volume 92. The front bulkhead 32 is formed with passage 128, which communicates hydraulically with a variable force solenoid (VFS) 130. Other passages carry hydraulic fluid to the surfaces of rotor 34 and stator 30, which surfaces are cooled by the fluid.

The front bulkhead 32 supports a module sump 132, which contains fluid supplied to module 10 from the hydraulic system of the transmission 54. Transmission 54 includes a transmission sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A seal 140 and a bearing 141, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34.

Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in front bulkhead 32, and bearing 76, fitted in rear bulkhead 60.

Seal 64, fitted in the rear bulkhead 60, and seal 140, fitted in the front bulkhead 32, prevent passage of fluid from module 10 located between the front and rear bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, second leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine is operating and the clutch is disengaged; and by both the engine and electric machine concurrently.

In accordance with the provisions of the patent statutes, the preferred embodiment has been described. However, it should be noted that the alternate embodiments can be practiced otherwise than as specifically illustrated and described.

The invention claimed is:

1. A powertrain module, comprising:
   an input;
   a first bulkhead supporting the input;
   a rotor hub;
   an electric machine including a stator connected to the first bulkhead, and a rotor connected to the rotor hub;
   a clutch for alternately opening and closing a drive connection between the input and the rotor hub;
   a servo supported on the input for actuating the clutch;
   a second bulkhead supporting the rotor hub; and
   a flexplate driveably connected to the rotor hub and connectable to a torque converter casing.

2. The module of claim 1, further comprising:
   first spline teeth formed on the rotor hub;
   second spline teeth formed on the flexplate and engageable with the first spline teeth.

3. The module of claim 1, further comprising a torsion damper connected to the input and connectable to an engine output, said damper located in a torque delivery path between the engine output and the input.

4. The module of claim 1, further comprising:
   a clutch hub driveably connected to the input;
   a tube secured to the rotor;
   a first leg secured to the tube and supported for rotation by a first bearing on the first bulkhead;
   a second leg secured to the tube and supported for rotation by a second bearing on the second bulkhead.

5. The module of claim 4, further comprising a resolver secured to the first bulkhead and the first leg, and located between the first and second bulkheads.

6. The module of claim 4, further comprising a third bearing fitted in the first bulkhead for supporting the input in rotation.

7. The module of claim 1, further comprising
   a clutch hub secured to the input;
   a tube secured to the rotor;
   the clutch further includes:
      first clutch plates secured to the clutch hub; and
      second clutch plates secured to the tube; and
   the servo further includes:
      a piston moveable in a cylinder, forcing the first and second clutch plates into mutual frictional engagement, thereby engaging the clutch; and
      a return spring forcing the piston away from the clutch plates, allowing the clutch plates to mutually disengage, thereby disengaging the clutch.

8. The module of claim 7, further comprising:
the clutch hub driveably connected to the input and supporting the servo; and
hydraulic lines formed in the input and clutch hub and communicating hydraulically with the servo.

9. The module of claim 1, wherein the first bulkhead further includes:
a sump for containing hydraulically fluid;
a solenoid-actuated valve; and
a line communicating hydraulically with the solenoid-actuated valve.

10. A powertrain module, comprising:
an input;
a first bulkhead supporting the input;
a clutch hub secured to the input;
a rotor hub;
an electric machine including a stator connected to the first bulkhead, and a rotor connected to the rotor hub;
a clutch for alternately opening and closing a drive connection between the input and the rotor;
a servo supported on the clutch hub for actuating the clutch and;
a second bulkhead supported on the input and supporting the rotor hub for rotation.

11. The module of claim 10, further comprising hydraulic lines formed in the input and clutch hub for communicating hydraulically with the servo.

12. The module of claim 10, further comprising a flexplate connected to the rotor hub and connectable to a torque converter casing.

13. The module of claim 10, further comprising:
a flexplate driveably connected to the rotor hub and connectable to a torque converter casing;
first spline teeth formed on the rotor hub; and
second spline teeth formed on the flexplate and engageable with the first spline teeth.

14. The module of claim 10, further comprising a torsion damper connected to the input and connectable to an engine output, said damper located in a torque delivery path between the engine output and the input.

15. The module of claim 10, wherein the rotor hub further comprises:
a tube secured to the rotor;
a first leg secured to the tube and supported for rotation by a first bearing on the first bulkhead;
a second leg secured to the tube and supported for rotation by a second bearing on the second bulkhead.

16. The module of claim 15, wherein the clutch further comprises:
first clutch plates secured to the clutch hub;
second clutch plates secured to the tube; and
the servo further comprises:
a piston moveable in a cylinder, forcing the first and second clutch plates into mutual frictional engagement, thereby engaging the clutch; and
a return spring forcing the piston away from the clutch plates, allowing the clutch plates to mutually disengage, thereby disengaging the clutch.

17. The module of claim 15, further comprising a resolver secured to the first bulkhead and the first leg, and located between the first and second bulkheads.

18. The module of claim 10, further comprising a third bearing fitted in the first bulkhead for supporting the input in rotation.

\* \* \* \* \*